United States Patent
Tzomik et al.

(10) Patent No.: US 11,326,067 B2
(45) Date of Patent: May 10, 2022

(54) LABELS (71) Applicant: HP Indigo B.V., Amstelveen (NL)

(72) Inventors: Inna Tzomik, Nes Ziona (IL); Daniel Skvirsky, Nes Ziona (IL); Faina Kogan, Nes Ziona (IL); Alexander Stolov, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 541 days.

(21) Appl. No.: 16/476,201

(22) PCT Filed: Apr. 19, 2017

(86) PCT No.: PCT/EP2017/059299
§ 371 (c)(1),
(2) Date: Jul. 5, 2019

(87) PCT Pub. No.: WO2018/192651
PCT Pub. Date: Oct. 25, 2018

(65) Prior Publication Data
US 2021/0009823 A1 Jan. 14, 2021

(51) Int. Cl.
*C09D 11/101* (2014.01)
*G03G 9/135* (2006.01)
*G03G 9/087* (2006.01)

(52) U.S. Cl.
CPC ....... *C09D 11/101* (2013.01); *G03G 9/08773* (2013.01); *G03G 9/1355* (2013.01)

(58) Field of Classification Search
CPC ..... B41M 7/0081; C09D 11/101; G03G 8/00; G03G 9/08773; G03G 9/13; G03G 9/131; G03G 9/132; G03G 9/1355
See application file for complete search history.

(56) References Cited

U.S. PATENT DOCUMENTS

| | | |
|---|---|---|
| 6,187,491 B1 | 2/2001 | Ferrar et al. |
| 7,132,208 B2 | 11/2006 | Lee et al. |
| 2007/0148414 A1* | 6/2007 | Halfyard ............. B41M 7/0045 430/97 |

(Continued)

FOREIGN PATENT DOCUMENTS

| | | |
|---|---|---|
| EP | 0823670 | 2/1998 |
| GB | 1564542 | 4/1980 |

(Continued)

OTHER PUBLICATIONS

Arkles et al., Gelest, Silane Coupling Agents, Connecting Across Boundaries, 2014, www.gelest.com, 76 pages.

(Continued)

*Primary Examiner* — Anh T Vo
(74) *Attorney, Agent, or Firm* — Thorpe North & Western LLP (57) ABSTRACT

Herein is described a method of providing a printed label. The method comprises: providing a printed label substrate having disposed thereon an electrostatically printed ink; applying a radiation curable overcoat composition to the printed ink, wherein the radiation curable overcoat composition comprises: radiation curable monomers and/or oligomers; a photoinitiator; and an organosilane having at least one hydrolysable group. Printed labels and an ink and overcoat set are also described herein.

15 Claims, 2 Drawing Sheets

(56) References Cited

U.S. PATENT DOCUMENTS

2008/0014513 A1\* 1/2008 Sisler .................. G03G 7/0006
  118/46
2010/0275815 A1 11/2010 Dave
2012/0231237 A1 9/2012 Ron et al.

FOREIGN PATENT DOCUMENTS

| JP | 2000191977 | 7/2000 |
| JP | 2003026997 | 1/2003 |
| WO | 2009080626 | 7/2009 |

OTHER PUBLICATIONS

Materne et al., Organosilane Technology in Coating Applications: Review and Perspectives, http://www.dowcorning.com/content/publishedlit/26-1402-01, 16 pages.

International Search Report dated Sep. 25, 2017 for PCT/EP2017/059299, Applicant HP Indigo B.V.

\* cited by examiner

LABELS

BACKGROUND

Printed labels are used on or in many types of product to display information, differentiate products and comply with regulatory requirements, such as ingredients lists, safety warnings, and so forth.

DETAILED DESCRIPTION

Before the present disclosure is disclosed and described, it is to be understood that this disclosure is not restricted to the particular process features and materials disclosed herein because such process features and materials may vary somewhat. It is also to be understood that the terminology used herein is used for the purpose of describing particular examples.

It is noted that, as used in this specification and the appended claims, the singular forms "a", "an", and "the" include plural referents unless the context clearly dictates otherwise.

As used herein, "carrier fluid", "carrier liquid", or "carrier vehicle", in the context of electrostatic ink compositions, refers to the fluid in which pigment particles, colorant, charge directors and other additives can be dispersed to form a liquid electrostatic composition or electrophotographic composition. The carrier liquids may include a mixture of a variety of different agents, such as surfactants, co-solvents, viscosity modifiers, and/or other possible ingredients.

As used herein, "electrostatic ink composition", "liquid electrophotographic composition" or "liquid electrostatic ink composition" generally refers to an ink composition that is generally suitable for use in an electrostatic printing process, sometimes termed an electrophotographic printing process. It may comprise pigment particles, which may comprise a thermoplastic resin.

As used herein, "pigment" generally includes pigment colorants, magnetic particles, aluminas, silicas, and/or other ceramics or organometallics, whether or not such particulates impart colour. Thus, though the present description primarily exemplifies the use of pigment colorants, the term "pigment" can be used more generally to describe not just pigment colorants, but other pigments such as organometallics, ferrites, ceramics, and so forth.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, for example, 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrostatic composition.

As used herein, "acidity", "acid number", or "acid value" refers to the mass of potassium hydroxide (KOH) in milligrams that neutralizes one gram of a substance. The acidity of a polymer can be measured according to standard techniques, for example, as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa·s or cPoise. In some examples, the melt viscosity can be measured using a rheometer, e.g., a commercially available AR-2000 Rheometer from Thermal Analysis Instruments, using the geometry of 25 mm steel plate-standard steel parallel plate, and finding the plate over plate rheometry isotherm at 120° C., 0.01 Hz shear rate. If the melt viscosity of a particular polymer is specified, unless otherwise stated, it is the melt viscosity for that polymer alone, in the absence of any of the other components of the electrostatic ink composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a substrate, for example a label substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, for example, an electric field having a field gradient of 50-400 V/µm, or more, in some examples, 600-900 V/µm, or more.

As used herein, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, and so forth.

As used herein, "heteroatom" may refer to nitrogen, oxygen, halogens, phosphorus, or sulfur.

As used herein, "alkyl", or similar expressions such as "alk" in alkoxy, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms.

The term "alkenyl" may refer to a branched, unbranched, or cyclic unsaturated hydrocarbon group, which may include one or more double bonds, one or more triple bonds or any combination thereof, which may or may not be conjugated, and, in some examples, are not aromatic. Alkenyl groups described herein may contain, but are not limited to, 2 to about 50 carbon atoms, or 2 to about 40 carbon atoms, or 2 to about 30 carbon atoms, or 2 to about 20 carbon atoms, or 2 to about 10 carbon atoms, or 2 to about 5 carbon atoms.

The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to about 30 carbon atoms or more, and may be selected from, phenyl and naphthyl.

As used herein, the term "about" is used to provide flexibility to a numerical range endpoint by providing that a given value may be a little above or a little below the endpoint to allow for variation in test methods or apparatus. The degree of flexibility of this term can be dictated by the particular variable as would be understood in the art.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also to include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, in the context of electrostatic ink compositions and unless the context indicates otherwise, wt % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect, there is provided a method of providing a printed label. The method may comprise:
  providing a printed label substrate having disposed thereon an electrostatically printed ink;
  applying an radiation curable overcoat composition to the printed ink, wherein the radiation curable overcoat composition comprises:
  radiation curable monomers and/or oligomers;
  a photoinitiator; and
  an organosilane having at least one hydrolysable group.

In another aspect, there is provided a printed label. The printed label may comprise:
  a label substrate;
  an electrostatically printed ink disposed on the substrate; and
  an overcoat composition disposed on the printed ink that has been cured under irradiation,
wherein the overcoat composition comprises the radiation cured product of a radiation curable overcoat composition comprising:
  radiation curable monomers and/or oligomers;
  a photoinitiator; and
  an organosilane having at least one hydrolysable group.

In a further aspect, there is provided an ink and overcoat set. The ink and overcoat set may comprise:
  a liquid electrostatic printing ink composition; and
  a radiation curable overcoat composition comprising:
    radiation curable monomers and/or oligomers;
    a photoinitiator; and
    an organosilane having at least one hydrolysable group.

In light of the importance of much of the information provided on labels to both consumers and regulatory bodies, it is desirable that printed labels are sufficiently durable that this information remains visible under the conditions that the product is packaged (for example, during sterilization and/or bottling), stored (whether, for example, in a refrigerated environment or hot and/or humid shelving), transported, displayed and used. This provides a particular challenge for products that remain in a wet environment for a prolonged period of time, such as shampoo bottles and beer bottles. The present inventors have found that many labels printed with electrostatic printing inks are vulnerable to the chemical and water environments to which they may be subjected during their lifecycle. The present inventors have found that examples of the methods and products described herein avoid or at least mitigate at least one of these difficulties. They have found that examples of the method and products have increased durability under chemical and water environments, providing increased scratch and rub resistance to the printed labels, following exposure to water. It has been found that the exposure to water leads to a reaction with the organosilane, and hardening of the radiation curable overcoat.

Printed Label

In some examples, a printed label is described. The printed label may be produced by any of the methods described herein. Each component of the printed label will be discussed in the sections that follow.

Radiation Curable Overcoat Composition

The radiation curable overcoat composition may be applied to the printed ink. In some examples, the printed label may comprise a printed label substrate and an overcoat composition disposed on the printed ink that has been cured under irradiation. In some examples, the printed label may comprise a label substrate, an electrostatically printed ink disposed on the label substrate and an overcoat composition disposed on the printed ink that has been cured under irradiation.

The radiation curable overcoat composition may comprise (i) a component selected from radiation curable monomers and radiation curable oligomers or mixtures thereof; (ii) a photoinitiator and (iii) an organosilane having at least one hydrolysable group.

In some examples, the radiation curable overcoat composition may comprise a component selected from radiation curable monomers and radiation curable oligomers or mixtures thereof, a photoinitiator, an organosilane having at least one hydrolysable group and, in some examples, an overcoat composition solvent. In some examples, the overcoat composition solvent may be a carrier liquid as described below. The overcoat composition solvent may be a solvent selected from water, an alcohol, e.g. a C1 to C3 alkanol, such as methanol or ethanol, esters and glycol ethers.

As used herein, oligomers are short polymers which may contain no more than 100 monomers. In some examples, oligomers are polymers that have a chain length of 100 monomers or less, for example, 50 monomers or less, for example, 40 monomers or less, for example, 30 monomers or less, for example, 20 monomers or less, for example, 15 monomers or less or, for example, 10 monomers or less.

In some examples, the radiation curable overcoat composition is a light curable overcoat composition (for example, a visible light curable composition or ultraviolet light curable overcoat composition), a heat curable overcoat composition, an electron beam curable overcoat composition, an ionising radiation curable overcoat composition (for example, a gamma radiation curable overcoat composition), a non-ionising radiation curable overcoat composition (for example, a microwave radiation curable overcoat composition. In some examples, the light curable overcoat composition is an ultraviolet light curable overcoat composition.

In some examples, the radiation curable monomers are light curable monomers (for example, visible light curable monomers or ultraviolet light curable monomers), heat curable monomers, electron beam curable monomers, ionising radiation curable monomers (for example, a gamma radiation curable monomers), non-ionising radiation curable monomers (for example, microwave radiation curable monomers). In some examples, the light curable monomers are ultraviolet light curable monomers.

In some examples, the radiation curable oligomers are light curable oligomers (for example, visible light curable oligomers or ultraviolet light curable oligomers), heat curable oligomers, electron beam curable oligomers, ionising radiation curable oligomers (for example, gamma radiation curable oligomers), non-ionising radiation curable oligomers (for example, microwave radiation curable oligomers). In some examples, the light curable oligomers are ultraviolet light curable oligomers.

In some examples, the radiation curable monomers and/or oligomers are selected from epoxide-containing molecules and alkene-containing molecules. In some examples, the radiation curable monomers and/or oligomers are selected from molecules comprising a plurality of epoxide groups and molecules comprising a plurality of alkene groups. As used herein, molecules containing a plurality of a certain type of group may comprise 2 or more, in some examples, 3 or more, in some examples, 4 or more of that type of group.

In some examples, the alkene-containing molecules may be selected from styrenes, acrylates, methacrylates, allyl-containing compounds, alkenylcarboxylic acids, alkenyl esters, alkenyl amides, dienes, alkenylcyanides, alkenylethers, urethanes, alkenyl alcohols, alkenyl thiols, alkenyl halides or a combination thereof. In some examples, the molecules comprising a plurality of alkene groups may comprise styrenes, acrylates, methacrylates, allyl-containing compounds, alkenylcarboxylic acids, alkenyl esters, alkenyl amides, dienes, alkenylcyanides, alkenylethers, urethanes, alkenyl alcohols, alkenyl thiols, alkenyl halides or a combination thereof. In some examples, the alkene-containing molecules or molecules containing a plurality of alkene groups may be acrylates or urethanes.

In some examples, the radiation curable overcoat composition comprises radiation curable monomers. In some examples, the radiation curable monomers are selected from monofunctional monomers (such as isobornyl acrylate), bifunctional monomers (such as tripropylene glycol diacrylate) and trifunctional monomers (such as trimethylol propane triacrylate). The type of monomer included in the radiation curable overcoat composition may affect the curing and/or coating properties, such as the flexibility, adhesiveness and viscosity.

In some examples, the radiation curable overcoat composition comprises radiation curable oligomers. In some examples, the radiation curable oligomers are selected from epoxy acrylates, epoxy methacrylates (such as those based on Bisphenol or the like), urethane acrylates, urethane methacrylates, polyester acrylates, polyester meth-acrylates, acrylic methacrylates, and methacrylic acrylates.

In some examples, the radiation curable overcoat composition comprises an acrylate selected from mono-, di-, tri- and tetra-acrylates. In some examples, the radiation curable overcoat composition comprises an acrylate selected from di-, tri- and tetra-acrylates.

In some examples, the radiation curable overcoat composition comprises a compound selected from 2,2-bis(acryloyloxymethyl)butyl acrylate, 2-[(acryloyloxy)methyl]-2-({2,2-bis[(acryloyloxy)methyl]butoxy}methyl) butylacrylate, oxydi-1,1-propanediyl bisacrylate, hexamethylene diacrylate, (1-methyl-1,2-ethanediyl)bis ([oxy(methyl-2,1-ethanediyl)]di-acrylate, 2-(2,2-bis{[2-acryloyloxy)ethanoxy]methyl}butoxy)ethyl acrylate, and 2,2-bis-(acryloyloxymethyl)butylacrylate.

In some examples, the radiation curable overcoat composition comprises an oligomer of 4,4'-(1-methylethylidene) bisphenol, (chloromethyl)oxirane and acrylate.

In some examples, the radiation curable overcoat composition comprises a compound selected from dipropylene glycol diacrylate, 2,2-bis(acryloyloxymethyl)butyl acrylate and (1-methyl-1,2-ethanediyl)bis[oxy(methyl-2,1-ethanediyl)]diacrylate. In some examples, the radiation curable overcoat composition comprises dipropylene glycol diacrylate, 2,2-bis(acryloyloxymethyl)butyl acrylate and (1-methyl-1,2-ethanediyl)bis-[oxy(methyl-2,1-ethanediyl)] diacrylate.

In some examples, the radiation curable overcoat composition comprises a mixture of dipropylene glycol diacrylate, 2,2-bis(acryloyloxymethyl)butyl acrylate, (1-methyl-1,2-ethanediyl)bis[oxy(methyl-2,1-ethanediyl)]diacrylate and an oligomer of 4,4'-(1-methyl-ethylidene)bisphenol, (chloromethyl)oxirane and acrylate.

In some examples, the radiation curable overcoat composition comprises a mixture of acrylated oligomers, hexamethylene diacrylate, (1-methyl-1,2-ethanediyl)bis([oxy (meth-yl-2,1-ethanediyl)] diacrylate and acrylated polysiloxanes.

Organosilane

The radiation curable overcoat composition may comprise an organosilane having at least one hydrolysable group.

In some examples, the organosilane having at least one hydrolysable group may have the following structure:

in which:
XR$^1$— is a non-hydrolysable organic moiety, wherein X is a terminal group and R$^1$ is a linker group;
R$^2$ is a hydrolysable organic moiety; and
n is 0, 1, 2 or 3.

In some examples, n is 1, 2 or 3. In some examples, n is 1.

In some examples, XR$^1$ is a non-hydrolysable organic moiety. In some examples, XR$^1$ is a non-hydrolysable organic moiety wherein X is a terminal group and R$^1$ is a linker group. In some examples, XR$^1$ may comprise a substituted or unsubstituted hydrocarbon.

In some examples, each R$^1$ is independently selected from (CH$_2$)$_m$ (wherein m may be 0, 1, 2, 3 or more), alkenylene, alkynylene, aryl, alkylarylene and arylalkylene, wherein when m is 0, the linker group is a single bond. In some examples, R$^1$ is (CH$_2$)$_m$ and m is 0, 1, 2, or 3. In some example, R$^1$ is (CH$_2$)$_m$ and m is 1, 2, or 3. In some examples, R$^1$ is (CH$_2$)$_3$.

In some examples, X is a terminal group. In some examples, each X is independently selected from hydrogen, halogen, vinyl, alkyl, alkenyl, acrylate, methacrylate, amino, alkylamino, aminoalkylamino, arylamino, benzylamino, alkylamido, alkylcarboxy, aryl-amido, arylcarboxy, alkylcarbamate, hydroxyl, alkoxy, thio, alkylthio, epoxy, glycidoxy, isocyanato.

In some examples, X is selected from (meth)acrylamide, (meth)acryloxy, (meth)acryloxyalkylamide, (meth)acryloxyalkylaryl, (meth)acryloxyaryl, amino, alkylamino, dialkylamino, arylamino, diarylamino, arylalkylamino, aminoaryl, arylamino, pyrimidyl, pyrrolyl, hydroxyalkylamino, dihydroxyalkylamino, alkoxyalkylamino, and dialkoxyalkylamino. In some examples, X is selected from glycidoxy, amino, vinyl, acryoyl, methacroyl, aminoethylamino, benzylamino, halo, chloro, and thio.

In some examples, XR$^1$ is selected from glycidoxy methyl, glycidoxy ethyl, glycidoxy propyl, aminomethyl, aminoethyl, aminopropyl, methacroylmethyl, methacroylethyl, methacroylpropyl, acroylmethyl, acroylethyl, acroylpropyl, vinyl, vinylmethyl, vinylethyl, vinylpropyl, aminomethylaminomethyl, aminoethylaminomethyl, aminopropylamino-methyl, aminomethylaminoethyl, aminoethylaminoethyl, aminopropylaminoethyl, aminomethylaminopropyl, aminoethylaminopropyl, aminopropylaminopropyl, chloro-methyl, chloroethyl, chloropropyl, benzylamino, thiomethyl (i.e., mercaptomethyl), thio-ethyl (i.e., mercaptoethyl), and thiopropyl (i.e., mercaptopropyl).

In some examples, R$^2$ is a hydrolysable organic moiety. In some examples, each R$^2$ may be the same or different. In some examples, each R$^2$ is selected from the group consisting of halogens, OR$^3$, NR$^3$R$^4$, phosphates, sulfates, oxides and OSiR$^3$$_3$. In some examples, R$^3$ and R$^4$ may be independently selected from hydrogen, substituted or unsubstituted alkyl, substituted or unsubstituted carboxyl, substituted or unsubstituted alkenyl, substituted or unsubstituted alkynyl and substituted or unsubstituted aryl.

In some examples, each R$^2$ may be OR$^3$. In some examples, each R$^2$ may be selected from hydroxyl, methoxy, ethoxy, isopropoxy, propoxy, tert-butyoxy, isobutoxy, butoxy, methoxyethoxy, methoxy-2-propoxy, methoxyethoxyethyoxy, acetoxy, isopropenoxy, and methylethylketoximino. In some examples, each R$^2$ may be selected from hydroxyl, methoxy, ethoxy, isopropoxy, and propoxy. In some examples, each R$^2$ may be selected from hydroxyl, methoxy and ethoxy. In some examples, each R$^2$ may be selected from methoxy and ethoxy.

In some examples, n is 1 and R$^2$ is OR$^3$. In some examples, each R$^2$ is the same. In some examples, R$^2$ may be selected from hydroxyl, methoxy, ethoxy, isopropoxy, propoxy, tert-butyoxy, isobutoxy, butoxy, methoxyethoxy, methoxy-2-propoxy, methoxyethoxyethyoxy, acetoxy, isopropenoxy, and methylethylketoximino. In some examples, R$^2$ may be selected from hydroxyl, methoxy, ethoxy, isopropoxy, and propoxy. In some examples, R$^2$ may be selected from hydroxyl, methoxy and ethoxy. In some examples, R$^2$ may be selected from methoxy and ethoxy.

In some examples, R$^1$ and R$^2$ together form a ring moiety. In some examples, R$^1$ and R$^2$ together form a ring moiety and the organosilane is a cyclic azasilane.

In some examples, the oroganosilane is selected from glycidoxy propyloxy trialkoxy-silane, aminopropyloxy trialkoxysilane, vinyltrialkoxysilane, methacrroyl propyl trialkoxy-silane, vinyl propyl trialkoxysilane, aminoethyl aminopropyl trialkoxysilane, benzyl amino trialkoxysilane, chloropropyl trialkoxysilane, and mercapto propyl trialkoxysilane. In some examples, the oganosilane is selected from glycidoxy propyloxy trialkoxy-silane, aminopropyloxy trialkoxysilane, vinyltrialkoxysilane, methacrroyl propyl trialkoxy-silane, vinyl propyl trialkoxysilane, aminoethyl aminopropyl trialkoxysilane, benzyl amino trialkoxysilane, chloropropyl trialkoxysilane, and mercapto propyl trialkoxysilane and the alkoxy group is selected from methoxy, ethoxy, isopropoxy, and propoxy.

In some examples, the radiation curable overcoat composition comprises organosilane in an amount of 30 wt. % or less, for example, 25 wt. % or less, for example, 20 wt. % or less, for example, 15 wt. % or less, for example, 10 wt. % or less. In some examples, the radiation curable overcoat composition comprises organosilane in an amount of 1 wt. % or more, for example, 2 wt. % or more, for example, 3 wt. % or more, for example, 4 wt. % or more, for example, 5 wt. % or more. In some examples, the radiation curable overcoat composition comprises organosilane in an amount of 1 to 30 wt. %, for example, 2 wt. % to 25 wt. %, for example, 3 wt. % to 20 wt. %, for example, 4 wt. % to 15 wt. %, for example, 8 wt. % to 12 wt. %, for example, 5 wt. % to 10 wt. %.

Photoinitiator

The radiation curable overcoat composition may comprise a photoinitiator. The photoinitiator may be any suitable photoinitiator. The photoinitiator may be any photoinitiator conventionally used in radiation curable overcoat compositions. In some examples, the photoinitiator may be a type I photoinitiator, that is, a photoinitiator that undergoes unimolecular bond cleavage on irradiation to yield free radicals, or a type II photoinitiator, that is, a photoinitiator that undergoes a bimolecular reaction in which the excited state of the photoinitiator interacts with a second molecule (a co-initiator) to generate free radicals. In some examples, the type I photoinitiator may be selected from a benzoin ester, a benzyl ketal, an α-dialkoxyacetophenone, a hydroxyalkylphenone, an α-aminoalkylphenone, and an acylphosphine oxide. In some examples, the type II photoinitiator may be selected from a benzophenone/amine and a thioxanthone/amine. In some examples, the photoinitiator may be benzophenone.

In some examples, the radiation curable overcoat composition comprises photoinitiator in an amount of 15 wt. % or less, in some examples, 12 wt. % or less, in some examples, 10 wt. % or less, in some examples, 7 wt. % or less, in some examples, 5 wt % or less, in some examples, 4 wt. % or less wt % or less, in some examples, 3 wt % or less, in some examples, 2 wt % or less, in some examples, 1 wt % or less, in some examples, 0.5 wt % or less. In some examples, the radiation curable overcoat composition comprises photoinitiator in an amount of 0.001 wt % or more, in some examples, 0.01 wt % or more, in some examples, 0.1 wt % or more, in some examples, 0.2 wt % or more, in some examples, 0.5 wt. % or more, in some examples, 1 wt. % or more, in some examples, 2 wt. % or more, in some examples, 3 wt. % or more, in some examples, 4 wt. % or more, in some examples, 5 wt. % or more. In some examples, the radiation curable overcoat composition comprises photoinitiator in an amount of 0.001 to 15 wt. %, in some examples, 0.01 to 10 wt. %, in some examples, 0.1 to 12 wt. %, in some examples, 3 to 12 wt. %, in some examples, 5 to 10 wt. %.

Printed Label Substrate

The printed label substrate may comprise a label substrate and an electrostatically printed ink disposed on the label substrate. In some examples, the printed label substrate may comprise a primer disposed between the label substrate and the electrostatically printed ink. In some examples, the printed label substrate may comprise a label substrate, a primer disposed on the label substrate and an electrostatically printed ink disposed on the primer.

In some examples, the printed label substrate may comprise an adhesive layer disposed on the opposing surface of the label substrate to the electrostatically printed ink. In some examples, the label substrate may comprise an adhesive layer disposed on the opposing surface of the label substrate to the surface onto which the electrostatically printed ink will be disposed.

Label Substrate

The label substrate may be any substrate suitable for use in a label. The label substrate may be any suitable substrate capable of having an electrostatic printing ink printed thereon. The label substrate may be any suitable substrate capable of having a primer applied thereon to which an electrostatic printing ink may be printed.

The label substrate may comprise a material selected from an organic or inorganic material. The label substrate may include a natural polymeric material, for example, cellulose. The label substrate may include a synthetic polymer material, for example, a polymer formed from alkylene monomers, including, for example, polyethylene and polypropylene, and co-polymers, such as styrene-polybutadiene. In some examples, the polypropylene may be biaxially oriented polypropylene.

In some examples, the label substrate may be or comprise a cellulosic substrate, such as a cellulosic paper. In some examples, the cellulosic substrate may be or comprise an uncoated cellulosic substrate, that is, absent of a coating of a polymeric material. In some examples, the cellulosic substrate, which may be a cellulosic paper, is coated with a polymeric material, for example, a polymer formed from styrene-butadiene resin. In some examples, the cellulosic paper has an inorganic material bound to its surface (before any primer layer is applied) with a polymeric material, wherein the inorganic material may be selected from, for example, kaolinite or calcium carbonate.

The label substrate may be or comprise an acrylic substrate, in some examples, a coated acrylic substrate, for example, coated with a styrene-butadiene co-polymer.

In some examples, the label substrate may be a transparent label substrate. In some examples, the label substrate and the adhesive layer, once it has been adhered to a second substrate, may be transparent.

In some examples, the label substrate may comprise a polymeric material. In some examples, the polymeric material may comprise a transparent polymeric material. In some examples the label substrate may comprise a film, for example, a thin film, of a polymeric material. In some examples, the polymeric material may comprise a polymer formed from alkylene monomers, including, for example, polyethylene and polypropylene, and co-polymers such as styrene-polybutadiene. In some examples, the polymeric material may comprise polyethylene (PE), linear low density polyethylene (LLDPE), low density polyethylene (LDPE), medium density polyethylene (MDPE), high density polyethylene (HDPE), polypropylene (PP), cast (cPP) polypropylene or biaxially oriented polypropylene (BOPP, oriented polyamide (OPA) or polyethylene terephthalate (PET).

In some examples, the label substrate may comprise a polymeric material having disposed thereon a primer. In some examples, the printed label substrate may comprise a polymeric material having disposed thereon a primer, wherein the primer is disposed between the polymer material and the electrostatically printed ink.

In some examples, the label substrate may be or comprise a metal, which may be in sheet form. In some examples, the label substrate may comprise a metallic foil or a metallized substrate. In some examples, the label substrate may comprise a metallized paper (i.e., paper having a metal layer thereon) or a metallized plastic film (i.e., plastic film having a metal layer thereon). In some examples, the metal may be selected from or made from, for example, aluminium (Al), silver (Ag), tin (Sn), copper (Cu), or mixtures thereof. In some examples, the label substrate may comprise an aluminium foil.

In some examples, the label substrate may comprise a plurality of layers of material, in some examples, a plurality of layers of film material laminated together. In some examples, a the label substrate may comprise a plurality of layers of material selected from polymeric materials (e.g., polymeric materials selected from PE, LLDPE, MDPE, PP, BOPP, PET and OPA), metallic materials (e.g., metallic foils such as aluminium foil, or metallized films such as metal-lized-PET (met-PET),or metallized-BOPP (met-BOPP), or metallized paper (met-paper) or any other metallized substrate), paper and combinations thereof. In some example, the label substrate comprises a plurality of layers of film of a polymeric material, such as a combination of films selected from PE, LLDPE, MDPE, PP, BOPP, PET and OPA, laminated together to form a pre-laminated label substrate. In some examples, the pre-laminated label substrate may comprise a metallic layer, such as an aluminium layer. In some examples, the pre-laminated label substrate may comprise a paper-Al-PE, PET-Al-PE, BOPP-met-BOPP or PET-PE laminate.

In some examples, the label substrate may comprise a metallized paper in the form of a paper substrate coated on at least one surface with a layer of metal, for example, aluminium. In some examples, the label substrate may comprise a metallized polymeric film in the form of a polymer substrate coated on at least one surface with a layer of metal, for example, aluminium. In some examples, the label substrate comprises a metallized polymeric film in the form of a metallized BOPP film or a metallized ET film.

In some examples, the label substrate may comprise a thin film of material, wherein the film has a thickness of 600 µm or less, in some examples, 250 µm or less, in some examples, 200 µm or less, in some examples, 150 µm or less, in some examples, 100 µm or less, in some examples, 95 µm or less, in some examples, 90 µm or less, in some examples, 85 µm or less, in some examples, 80 µm or less. In some examples, the film of material has a thickness of about 80 µm. In some examples, the film of material has a thickness of about 60 µm.

In some examples, the label substrate may comprise a thin film of material, wherein the film has a thickness of 5 µm or more, in some examples, 10 µm or more, in some examples, 15 µm or more, in some examples, 20 µm or more, in some examples, 25 µm or more, in some examples, 30 µm or more, in some examples, 35 µm or more, in some examples, 40 µm or more, in some examples, 45 µm or more, in some examples, 50 µm or more, in some examples, 55 µm or more, in some examples, 60 µm or more.

Adhesive Layer

In some examples, the printed label may comprise an adhesive layer disposed on the opposing surface of the printed label substrate to the electrostatically printed ink. In some examples, the printed label substrate may comprise an adhesive layer disposed on the opposing surface of the label substrate to the electrostatically printed ink.

In some examples, the adhesive layer is applied to the surface of the label substrate before the printed label substrate is provided for the method of providing a printed label. In some examples, the adhesive layer is applied to the surface of the label substrate before, during or after the application of the radiation curable overcoat composition. In some examples, the adhesive layer is applied to the surface of the label substrate before, during or after the application (i.e., printing) of the electrostatically printed ink. In some examples, the adhesive layer is applied to the surface of the label substrate before, during or after the application of the primer layer to the surface of the label substrate.

In some examples, a removable release layer is applied to the adhesive layer. In some examples, the removable release layer is applied at the same time as the adhesive layer is applied. In some examples, the removable release layer is applied immediately after the adhesive layer is applied. In some examples the removable release layer is applied after the adhesive layer is applied but prior to the next layer being applied to the opposing surface of the label substrate.

In some examples, the adhesive layer is a pressure-sensitive adhesive layer, a heat-sensitive adhesive layer, a contact adhesive layer, a drying adhesive layer (that is, an adhesive that adheres on drying), a radiation-curing adhesive layer (e.g., a UV-curing adhesive layer) or a moisture-curing adhesive layer (e.g., an adhesive that cures by reacting with moisture present, for example, on a second surface to which the label is, in use, applied or adhered, or in the air). The pressure sensitive adhesive may be a hot melt pressure sensitive adhesive, such as for example a rubber-based or acrylic-based pressure sensitive adhesive. The adhesive could be based on a rubber-based hot melt composition, a solvent rubber adhesive, a solvent acrylic adhesive, or a solvent polyurethane adhesive. The adhesive could be emulsion-based such as an emulsion acrylic adhesive.

In some examples, the adhesive layer is 100 µm or less in thickness, for example, 90 µm or less in thickness, 80 µm or less in thickness, 70 µm or less in thickness, 60 µm or less in thickness, 50 µm or less in thickness, 40 µm or less in thickness, 30 µm or less in thickness, 20 µm or less in thickness, or 15 µm or less in thickness.

In some examples, the adhesive layer is 15 µm or more in thickness, 20 µm or more in thickness, 30 µm or more in thickness, 40 µm or more in thickness, 50 µm or more in thickness, 60 µm or more in thickness, 70 µm or more in thickness, 80 µm or more in thickness, 90 µm or more in thickness, in some examples, 100 µm or more in thickness.

Primer

In some examples, the printed label substrate may comprise a primer disposed between the label substrate and the electrostatically printed ink.

In some examples, the printed label substrate is provided by applying a primer to the label substrate, for example, to a surface of the label substrate, and then by applying (i.e., printing) an electrostatic printing ink on the primer. Thus, a printed label substrate having disposed thereon an electrostatically printed ink and a primer disposed between the label substrate and the electrostatically printed ink is formed.

The primer may comprise a primer resin. When it is applied, the primer resin may comprise a cross-linkable primer resin. The primer resin in the printed label may comprise a cross-linked primer resin.

In a printed label, the primer resin may be a cross-linked primer resin. In the method of providing a printed label substrate, the primer resin may be a cross-linkable primer resin until after the primer resin is applied.

In some examples, the primer resin may be selected from the group comprising or consisting of hydroxyl containing resins, carboxylic group containing resins, amine based polymer formulations, and combinations thereof. In some examples, a hydroxyl containing resin may be selected from polyvinyl alcohol resins, for example, polyvinyl alcohol based polyvinyl butyral formulations (such as Butvar resins from Eastman), Vinnol® (from Wacker polymers), cellulose derivative additives (from Eastman), polyester resins (such as Dynapol from Evonic) and polyurethane-based formulations with hydroxyl groups. In some examples, the carboxylic group containing resins may be selected from olefin co-acrylic or methacrylic acid based copolymers, polyacrylic acid based polymers, and polylactic acid based polymers. In some examples, the copolymer is a copolymer of ethylene and an acid selected from acrylic acid or methacrylic acid, and, in some examples, acid selected from acrylic acid or methacrylic acid is present in the resin in an amount of from 10 wt % to 50 wt %, in some examples 20 to 40 wt %. In some examples, the amine based polymer formulations may be selected from polyamines and polyethylene imines (which are also known as polyaziridines). The primer resin may be selected from the group comprising, or consisting of, a polyvinyl alcohol resin, cellulose based resins, a polyester, a polyamine, a polyethylene imine resin, polyamide resin, polyurethane, copolymers of an alkylene monomer and an acrylic or methacrylic acid monomer, and polyacrylic polymers. In some examples, the amine based polymer formulations may comprise polyethylene imines (also known as polyaziridines). In some examples, the primer may comprise a polyethylene imine in an amount of 1 to 20 wt. %, in some examples, 2 to 15 wt. %, in some examples, 3 to 10 wt. %. In some examples, the primer may comprise a polyethylene imine in an amount of up to 10 wt %.

In some examples, the primer resin comprises a carboxylic functional group, an amine functional group or a polyol functional group, or a combination thereof. In some examples, the primer resin comprises an amine functional group or a carboxylic functional group.

In some examples, the primer resin comprises an amine functional group. In some examples, the primer resin comprises or consists of a polyethylene imine resin.

The resin may have been crosslinked with a crosslinker, e.g. a cross-linker selected from melamine formaldehyde resin, phenol formaldehyde resins, polyethyleneimine and Zn and Zr complexes.

Examples of materials suitable as a primer include Michelman DigiPrime® 050 or Michelman DigiPrime® 030.

In some examples, the primer on the printed label substrate of the printed label comprises a cross-linked primer resin.

In some examples, the primer is applied or has been applied in an amount such that the coat weight of the primer on the label substrate is 0.01 $g/m^2$ or more, in some examples, 0.05 $g/m^2$ or more, in some examples, 0.1 $g/m^2$ or more, in some examples, in some examples, 0.14 $g/m^2$ or more, 0.15 $g/m^2$ or more, in some examples, about 0.18 $g/m^2$. In some examples, the primer is applied or has been applied in an amount such that the coat weight of the primer resin on the label substrate is up to about 0.2 $g/m^2$, in some examples, up to about 0.5 $g/m^2$, in some examples, up to about 1 $g/m^2$, in some examples, up to about 1.5 $g/m^2$.

Electrostatically Printed Ink

In some examples, the printed label substrate has disposed thereon an electrostatically printed ink. In some examples, the printed label substrate has disposed thereon a printed ink, which may be an electrostatically printed ink.

In some examples, the printed label substrate is provided by applying (i.e., printing) an electrostatic printing ink to the label substrate, for example, to a surface of the label substrate. Thus, a printed label substrate having disposed thereon an electrostatically printed ink is formed.

In some examples, the electrostatically printed ink may be present in an amount such that the coat weight of electrostatically printed ink measured over the surface of the label substrate is at least 0.01 $g/m^2$, in some examples, at least 0.05 $g/m^2$, in some examples, at least 0.1 $g/m^2$, in some examples, at least 0.5 $g/m^2$, in some examples, at least about 1 $g/m^2$. In some examples, the electrostatically printed ink may be present in an amount such that the coat weight of electrostatically printed ink measured over the surface of the label substrate is up to about 16 $g/m^2$, in some examples, up to about 10 $g/m^2$, in some examples, up to about 5 $g/m^2$, in some examples, up to about 4 $g/m^2$.

Electrostatic Printing Ink

Electrostatic printing, for example, liquid electrostatic printing, is one method by which images or information can be printed onto substrates, such as label substrates. The electrostatic printing process generally involves creating an image on a photoconductive surface, applying a liquid electrostatic ink or a dry toner having charged particles to the photoconductive surface, such that they selectively bind to the image, and then transferring the charged particles in the form of the image to a substrate, such as a label substrate.

The electrostatic printing ink may be electrostatically printed onto the label substrate. In some examples, the electrostatic printing ink may be electrostatically printed onto the label substrate, thus forming the electrostatically printed ink. In some examples, the electrostatic printing ink may be electrostatically printed onto the primer, which has been applied onto the label substrate.

The electrostatic printing ink may comprise a thermoplastic resin. The electrostatic printing ink may comprise a cross-linkable thermoplastic resin. The electrostatically printed ink (i.e., the electrostatic printing ink after it has been electrostatically printed) may comprise a cross-linked thermoplastic resin. In the printed label, the electrostatically printed ink may comprise a cross-linked thermoplastic resin.

In some examples, the electrostatic printing ink may be a liquid electrostatic printing ink or a powder toner, that is, a dry toner for use in dry electrostatic printing. In some examples, the electrostatically printed ink may have been a liquid electrostatic printing ink or a powder toner prior to printing.

The electrostatically printed ink disposed on a surface of the label substrate may have been printed using a liquid electrostatic printing process. In some examples, the electrostatic printing ink may comprise a colorant or pigment and a thermoplastic resin. In some examples, the electrostatic printing ink may be a liquid electrostatic printing ink, which may comprise a colorant or pigment, a thermoplastic resin and a carrier liquid. The liquid electrostatic printing ink may further comprise an additive such as a charge director, charge adjuvant, surfactant, viscosity modifier, emulsifier and the like.

In some examples, the colorant is a pigment. In some examples, the liquid electrostatic printing ink may not contain any pigment, or may comprise substantially zero pigment and thus be a pigment-free composition, which may be useful in providing a particular transparent gloss or sheen to a label substrate.

In some examples, after printing, a liquid electrostatic printing ink (i.e., the liquid electrostatically printed ink) may comprise a reduced amount of carrier liquid compared with the liquid electrostatic printing ink before printing. In some examples, the liquid electrostatically printed ink may be substantially free from carrier liquid. Substantially free from carrier liquid may indicate that the printed ink contains 5 wt. % or less carrier liquid, in some examples, 2 wt. % or less carrier liquid, in some examples, 1 wt. % or less carrier liquid, in some examples, 0.5 wt. % or less carrier liquid. In some examples, the electrostatically printed ink is free from carrier liquid. Each of these components of an electrostatic printing ink will be described separately in the sub-sections which follow.

Thermoplastic resin: The thermoplastic resin may be referred to as a polymer resin or a thermoplastic polymer. In some examples, the thermoplastic resin of the electrostatic printing ink comprises a carboxylic functional group, an amine functional group, a polyol functional group or a combination thereof. In some examples, the thermoplastic resin of the electrostatic printing ink comprises a carboxylic functional group. In some examples, the thermoplastic resin of the electrostatic printing ink comprises an amine functional group. In some examples, the thermoplastic resin of the electrostatic printing ink comprises a polyol functional group.

In some examples, the thermoplastic resin comprises or consists of a polymer having acidic side groups. In some examples, the acidic side groups may be in free acid form or may be in the form of an anion and associated with a counterion, generally a metal counterion, for example, a metal selected from the alkali metals, such as lithium, sodium and potassium, alkali earth metals, such as magnesium or calcium, and transition metals, such as zinc.

In some examples, the thermoplastic resin may be a copolymer of an alkylene monomer and a monomer selected from acrylic acid and methacrylic acid. The thermoplastic resin having acidic side groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers that are at least partially neutralized with metal ions (e.g., Zn, Na, Li), such as SURLYN® ionomers. The thermoplastic resin comprising acidic side groups can be a co-polymer of ethylene and an ethylenically unsaturated acid of either acrylic or methacrylic acid, where the ethylenically unsaturated acid of either acrylic or methacrylic acid may constitute from 5 wt. % to about 25 wt. % of the co-polymer, in some examples, from 10 wt. % to about 20 wt. % of the co-polymer.

In some examples, the thermoplastic resin of the electrostatic printing ink comprises polyolefin co-polymers, polyethylene co-acrylic co-polymers, polyethylene co-methacrylic co-polymers, polyethylene co-vinyl acetate co-polymers, ionomers, or combinations thereof. In some examples, the thermoplastic resin of the electrostatic printing ink comprises or consists of alkylene acrylic or methacrylic acid resins, polyurethane resins, polyethylene imine resins, polyamide resins, polyvinyl alcohol resins, and combinations thereof.

In some examples, the thermoplastic resin may comprise ethylene or propylene acrylic acid co-polymers; ethylene or propylene methacrylic acid co-polymers; ethylene vinyl acetate co-polymers; co-polymers of ethylene or propylene (e.g., 80 wt. % to 99.9 wt. %), and alkyl (e.g., C1 to C5) ester of methacrylic or acrylic acid (e.g., 0.1 wt. % to 20 wt. %); co-polymers of ethylene (e.g., 80 wt. % to 99.9 wt. %), acrylic or methacrylic acid (e.g., 0.1 wt. % to 20.0 wt. %) and alkyl (e.g., C1 to C5) ester of methacrylic or acrylic acid (e.g., 0.1 wt. % to 20 wt. %); co-polymers of ethylene or propylene (e.g., 70 wt. % to 99.9 wt. %) and maleic anhydride (e.g., 0.1 wt. % to 30 wt. %); polyethylene; polystyrene; isotactic polypropylene (crystalline); co-polymers of ethylene ethyl acrylate; polyesters; polyvinyl toluene; polyamides; styrene/butadiene co-polymers; epoxy resins; acrylic resins (e.g., co-polymer of acrylic or methacrylic acid and at least one alkyl ester of acrylic or methacrylic acid wherein alkyl may have from 1 to about 20 carbon atoms, such as methyl methacrylate (e.g., 50 wt. % to 90 wt. %)/methacrylic acid (e.g., 0 wt. % to 20 wt. %)/ethylhexylacrylate (e.g,. 10 wt. % to 50 wt. %); ethylene-acrylate terpolymers: ethylene-acrylic esters-maleic anhydride (MAH) or glycidyl methacrylate (GMA) terpolymers; ethylene-acrylic acid ionomers or combinations thereof.

The thermoplastic resin may comprise a polymer having acidic side groups. The polymer having acidic side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more, in some examples, an acidity of 90 mg KOH/g or more, in some examples, an acidity of 100 mg KOH/g or more, in some examples, an acidity of 105 mg KOH/g or more, in some examples, 110 mg KOH/g or more, in some examples, 115 mg KOH/g or more. The polymer having acidic side groups may have an acidity of 200 mg KOH/g or less, in some examples, 190 mg or less, in some examples, 180 mg or less, in some examples, 130 mg KOH/g or less, in some examples, 120 mg KOH/g or less. The acidity of a polymer in mg KOH/g can be measured by using standard procedures, for example, by using the procedure described in ASTM D1386.

The thermoplastic resin may comprise a polymer having acidic side groups that has a melt flow rate of about 70 g/10 minutes or less, in some examples, about 60 g/10 minutes or less, in some examples, about 50 g/10 minutes or less, in some examples, about 40 g/10 minutes or less, in some examples, 30 g/10 minutes or less, in some examples, 20 g/10 minutes or less, in some examples, 10 g/10 minutes or less. In some examples, all polymers having acidic side groups and/or ester groups in the particles each individually have a melt flow rate of 90 g/10 minutes or less, in some examples, 80 g/10 minutes or less, in some examples, 70 g/10 minutes or less, in some examples, 60 g/10 minutes or less.

The polymer having acidic side groups can have a melt flow rate of about 10 g/10 minutes to about 120 g/10 minutes, in some examples, about 10 g/10 minutes to about 70 g/10 minutes, in some examples, about 10 g/10 minutes to about 40 g/10 minutes, in some examples, about 20 g/10 minutes to about 30 g/10 minutes. The polymer having acidic side groups can have a melt flow rate of, in some examples, about 50 g/10 minutes to about 120 g/10 minutes, in some examples, about 60 g/10 minutes to about 100 g/10 minutes. The melt flow rate can be measured using standard procedures, for example, as described in ASTM D1238.

The acidic side groups may be in free acid form or may be in the form of an anion and associated with a counterion, generally metal counterions, for example, a metal selected from the alkali metals, such as lithium, sodium and potassium, alkali earth metals, such as magnesium or calcium, and transition metals, such as zinc. The thermoplastic resin having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers that are at least partially neutralized with metal ions (e.g., Zn, Na, Li) such as SURLYN® ionomers. The polymer comprising acidic side groups can be a co-polymer of ethylene and an ethylenically unsaturated acid of either acrylic or methacrylic acid, in which the ethylenically unsaturated acid of either acrylic or methacrylic acid constitutes from 5 wt. % to about 25 wt. % of the co-polymer, in some examples, from 10 wt. % to about 20 wt. % of the co-polymer.

The thermoplastic resin may comprise two different polymers having acidic side groups. The two polymers having acidic side groups may have different acidities, which may fall within the ranges mentioned above. The thermoplastic resin may comprise a first polymer having acidic side groups that has an acidity of from 10 mg KOH/g to 110 mg KOH/g, in some examples, 20 mg KOH/g to 110 mg KOH/g, in some examples, 30 mg KOH/g to 110 mg KOH/g, in some examples, 50 mg KOH/g to 110 mg KOH/g, and a second polymer having acidic side groups that has an acidity of 110 mg KOH/g to 130 mg KOH/g.

The thermoplastic resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples, 20 mg KOH/g to 110 mg KOH/g, in some examples, 30 mg KOH/g to 110 mg KOH/g, in some examples, 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

In some examples, the ratio of the first polymer having acidic side groups to the second polymer having acidic side groups can be from about 10:1 to about 2:1. In some examples, the ratio can be from about 6:1 to about 3:1, in some examples, about 4:1.

The thermoplastic resin may comprise a polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; said polymer may be a polymer having acidic side groups as described herein. The thermoplastic resin may comprise a first polymer having a melt viscosity of 15000 poise or more, in some examples, 20000 poise or more, in some examples, 50000 poise or more, in some examples, 70000 poise or more; and in some examples, the polymer resin may comprise a second polymer having a melt viscosity less than the first polymer, in some examples, a melt viscosity of 15000 poise or less, in some examples, a melt viscosity of 10000 poise or less, in some examples, 1000 poise or less, in some examples, 100 poise or less, in some examples, 50 poise or less, and in some examples, 10 poise or less. The thermoplastic resin may comprise a first polymer having a melt viscosity of more than 60000 poise, in some examples, from 60000 poise to 100000 poise, in some examples, from 65000 poise to 85000 poise; a second polymer having a melt viscosity of from 15000 poise to 40000 poise, in some examples, 20000 poise to 30000 poise, and a third polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; an example of the first polymer is Nucrel 960 (from DuPont), an example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured by using a rheometer, for example, a commercially available AR-2000 Rheometer from Thermal Analysis Instruments, by using the geometry of 25 mm steel plate-standard steel parallel plate, and finding the plate over plate rheometry isotherm at 120° C., 0.01 Hz shear rate.

If the thermoplastic resin comprises a single type of polymer, the polymer (excluding any other components of the electrostatic ink composition) may have a melt viscosity of 6000 poise or more, in some examples, a melt viscosity of 8000 poise or more, in some examples, a melt viscosity of 10000 poise or more, in some examples, a melt viscosity of 12000 poise or more. If the thermoplastic resin comprises a plurality of polymers all of the polymers of the thermoplastic resin may together form a mixture (excluding any other components of the electrostatic ink composition) that has a melt viscosity of 6000 poise or more, in some examples, a melt viscosity of 8000 poise or more, in some examples, a melt viscosity of 10000 poise or more, in some examples, a melt viscosity of 12000 poise or more. Melt viscosity can be measured by using standard techniques. The melt viscosity can be measured by using a rheometer, for example, a commercially available AR-2000 Rheometer from Thermal Analysis Instruments, by using the geometry of 25 mm steel plate-standard steel parallel plate, and finding the plate over plate rheometry isotherm at 120° C., 0.01 Hz shear rate.

The thermoplastic resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g., Zn, Na, Li) such as SURLYN® ionomers. The thermoplastic resin may comprise (i) a first polymer that is a co-polymer of ethylene and an ethylenically unsaturated acid of either acrylic acid or methacrylic acid, wherein the ethylenically unsaturated acid of either acrylic or methacrylic acid constitutes from 8 wt. % to about 16 wt. % of the co-polymer, in some examples, 10 wt. % to 16 wt. % of the co-polymer; and (ii) a second polymer that is a co-polymer of ethylene and an ethylenically unsaturated acid of either acrylic acid or methacrylic acid, wherein the ethylenically unsaturated acid of either acrylic or methacrylic acid constitutes from 12 wt. % to about 30 wt. % of the co-polymer, in some examples, from 14 wt. % to about 20 wt. % of the co-polymer, in some examples, from 16 wt. % to about 20 wt. % of the co-polymer, and in some examples, from 17 wt. % to 19 wt. % of the co-polymer.

The thermoplastic resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, for example, ethylene or propylene. The esterified acrylic acid or esterified methacrylic acid maybe an alkyl ester of acrylic acid or an alkyl ester of methacrylic acid, respectively. The alkyl group in the alkyl ester of acrylic or methacrylic acid may be an alkyl group having 1 to 30 carbon atoms, in some examples, 1 to 20 carbon atoms, in some examples, 1 to 10 carbon atoms; in some examples, selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid, and (iii) a third monomer which is an alkylene monomer selected from ethylene and propylene. The first monomer may constitute 1% to 50% by weight of the co-polymer, in some examples, 5% to 40% by weight, in some examples, 5% to 20% by weight of the co-polymer, and in some examples, 5% to 15% by weight of the co-polymer. The second monomer may constitute 1% to 50% by weight of the co-polymer, in some examples, 5% to 40% by weight of the co-polymer, in some examples, 5% to 20% by weight of the co-polymer, and in some examples, 5% to 15% by weight of the co-polymer. In some examples, the first monomer constitutes 5% to 40% by weight of the co-polymer, the second monomer constitutes 5% to 40% by weight of the co-polymer, with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, with the third monomer constituting the remaining weight of the co-polymer. The polymer may be selected from the Bynel® class of polymers, including Bynel 2022 and Bynel 2002, which are available from DuPont®.

The polymer having ester side groups may constitute 1% or more by weight of the total amount of the resin polymers, for example, thermoplastic resins, in the liquid electrostatic ink composition and/or the electrostatic ink printed on the primer layer, for example, the total amount of the polymer or polymers having acidic side groups and polymer having ester side groups. The polymer having ester side groups may constitute 5% or more by weight of the total amount of the resin polymers, that is, the thermoplastic resin polymers, in some examples, 8% or more by weight of the total amount of the resin polymers, for example, thermoplastic resin polymers, in some examples, 10% or more by weight of the total amount of the resin polymers, for example, thermoplastic resin polymers, in some examples, 15% or more by weight of the total amount of the resin polymers, for example, thermoplastic resin polymers, in some examples, 20% or more by weight of the total amount of the resin polymers, for example, thermoplastic resin polymers, in some examples, 25% or more by weight of the total amount of the resin polymers, for example, thermoplastic resin polymers, in some examples, 30% or more by weight of the total amount of the resin polymers, for example, thermoplastic resin polymers, in some examples, 35% or more by weight of the total amount of the resin polymers, for example, thermoplastic resin polymers, in the liquid electrostatic ink composition and/or the electrostatic ink printed on the primer layer. The polymer having ester side groups may constitute from 5% to 50% by weight of the total amount of the resin polymers, for example, thermoplastic resin polymers, in the liquid electrostatic composition and/or the ink printed on the primer layer, in some examples, 10% to 40% by weight of the total amount of the resin polymers, for example, thermoplastic resin polymers, in the liquid electrostatic ink composition and/or the electrostatic ink composition printed on the primer layer, in some examples, 5% to 30% by weight of the total amount of the resin polymers, for example, thermoplastic resin polymers, in the liquid electrostatic ink composition and/or the ink composition printed on the primer layer, in some examples, 5% to 15% by weight of the total amount of the resin polymers, for example, thermoplastic resin polymers, in the liquid electrostatic ink composition and/or the ink composition printed on the primer layer, in some examples, 15% to 30% by weight of the total amount of the resin polymers, for example, thermoplastic resin polymers, in the liquid electrostatic ink composition and/or the ink composition printed on the primer layer.

The polymer having ester side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more. The polymer having ester side groups may have an acidity of 100 mg KOH/g or less, in some examples, 90 mg KOH/g or less. The polymer having ester side groups may have an acidity of 60 mg KOH/g to 90 mg KOH/g, in some examples, 70 mg KOH/g to 80 mg KOH/g.

The polymer having ester side groups may have a melt flow rate of about 10 g/10 minutes to about 120 g/10 minutes, in some examples, about 10 g/10 minutes to about 50 g/10 minutes, in some examples, about 20 g/10 minutes to about 40 g/10 minutes, in some examples, about 25 g/10 minutes to about 35 g/10 minutes.

The polymer, polymers, co-polymer, or co-polymers of the thermoplastic resin can in some examples be selected from the Nucrel family of resins (e.g., Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022 (sold by E.I. du PONT)), the AC family of resins (e.g., AC-5120, AC-5180, AC-540, AC-580 (sold by Honeywell)), the Aclyn family of resins (e.g., Aclyn 201, Aclyn 246, Aclyn 285, Aclyn 295 (sold by Honeywell)), and the Lotader family of resins (e.g., Lotader 2210, Lotader, 3430, and Lotader 8200 (sold by Arkema)).

The polymer resin can constitute about 5 to 90%, in some examples, about 50 to 80%, by weight of the solids of the liquid electrostatic ink composition and/or the ink composition printed on the label substrate. The resin can constitute about 60 to 95%, in some examples, about 70 to 95%, by weight of the solids of the liquid electrostatic ink composition and/or the ink composition printed on the primer layer.

Colorant: An electrostatically printed ink may comprise a colorant. An electrostatic printing ink may comprise a colorant. The colorant may be a dye or a pigment. The colorant can be any colorant compatible with the liquid carrier and useful for electrostatic printing. For example, the colorant may be present as pigment particles or may comprise a resin (in addition to the resins described herein) and a pigment. The resins and pigments can be any of those standardly used. In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. In some examples, the pigment may be a white pigment. Where the pigment is a white pigment particle, the pigment particle may be selected from the group consisting of $TiO_2$, calcium carbonate, zinc oxide, and mixtures thereof. In some examples, the white pigment particle may comprise an alumina-$TiO_2$ pigment.

In some examples, the colorant or pigment particles may have a median particle size or $d_{50}$ of 20 µm or less, for example, 15 µm or less, for example, 10 µm or less, for example, 5 µm or less, for example, 4 µm or less, for example, 3 µm or less, for example, 2 µm or less, for example, 1 µm or less, for example, 0.9 µm or less, for example, 0.8 µm or less, for example, 0.7 µm or less, for example, 0.6 µm or less, for example, 0.5 µm or less. Unless otherwise stated, the particle size of the colorant or pigment particle and the resin coated pigment particle is determined by using laser diffraction on a Malvern Mastersizer 2000 according to the standard procedure as described in the operating manual.

The colorant or pigment particle may be present in an electrostatic ink composition in an amount of from 10 wt. % to 80 wt. % of the total amount of resin and pigment, in some examples, 15 wt. % to 80 wt. %, in some examples, 15 wt. % to 60 wt. %, in some examples, 15 wt. % to 50 wt. %, in some examples, 15 wt. % to 40 wt. %, in some examples, 15 wt. % to 30 wt. % of the total amount of resin and colorant. In some examples, the colorant or pigment particle may be present in an electrostatic ink composition in an amount of at least 50 wt. % of the total amount of resin and colorant or pigment, for example, at least 55 wt. % of the total amount of resin and colorant or pigment.

Carrier Liquid: Before and during printing of the electrostatic printing ink, the electrostatic printing ink may comprise a carrier liquid. Generally, the carrier liquid can act as a dispersing medium for the other components in the electrostatic printing ink. For example, the carrier liquid may comprise or be a hydrocarbon, silicone oil, vegetable oil or the like. The carrier liquid may include, but is not limited to, an insulating, non-polar, non-aqueous liquid that can be used as a medium for toner particles. The carrier liquid can include compounds that have a resistivity in excess of about $10^9$ ohm·cm. The carrier liquid may have a dielectric constant below about 5, in some examples, below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before electrostatic printing, the carrier liquid can constitute about 20% to 99.5% by weight of the electrostatic printing ink, in some examples, 60% to 99.5% by weight of the electrostatic printing ink. Before printing, the carrier liquid may constitute about 40% to 90% by weight of the electrostatic printing ink. Before printing, the carrier liquid may constitute about 60% to 80% by weight of the electrostatic printing ink. Before printing, the carrier liquid may constitute about 90% to 99.5% by weight of the electrostatic printing ink, in some examples, 95% to 99% by weight of the electrostatic printing ink.

The electrostatic printing ink, when electrostatically printed (that is, the electrostatically printed ink), may be substantially free from carrier liquid. In an electrostatic printing process and/or afterwards, the carrier liquid may be removed, for example, by an electrophoresis process during printing and/or evaporation, such that substantially just solids are transferred to the label substrate. Substantially free from carrier liquid may indicate that the ink printed on the label substrate contains 5 wt. % or less carrier liquid, in some examples, 2 wt. % or less carrier liquid, in some examples, 1 wt. % or less carrier liquid, in some examples, 0.5 wt. % or less carrier liquid. In some examples, the electrostatically printed ink on the label substrate is free from carrier liquid.

Charge director: A liquid electrostatic printing ink and/or electrostatically printed ink may comprise a charge director. A charge director can be added to an electrostatic printing ink to impart a charge of a desired polarity and/or maintain sufficient electrostatic charge on the particles of an electrostatic printing ink. The charge director may comprise ionic compounds, including, for example, metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, and the like. The charge director may be selected from oil-solble petroleum sulfonates (e.g., neutral Calcium Petronate™, neutral Barium Petronate™, and basic Barium Petronate™) polybutylene succinimides (e.g., OLOA™ 1200 and Amoco 575), and glyceride salts (e.g., sodium salts of phosphate mono- and diglycerides with unsaturated and saturated acid substituents), sulfonic acid salts including, for example, barium, sodium, calcium, and aluminium salts of sulfonic acid. The sulfonic acids may include, for example, alkyl sulfonic acids, aryl sulfonic acids, and sulfonic acids of alkyl succinates (e.g., see WO 2007/130069). The charge director may impart a negative charge or a positive charge on the resin-containing particles of an electrostatic printing ink.

The charge director can comprise a sulfosuccinate moiety of the general formula: $[R_a-O-C(O)CH_2CH(SO_3^-)C(O)-O-R_b]$, in which each of $R_a$ and $R_b$ is an alkyl group. In some examples, the charge director comprises nanoparticles of a simple salt and a sulfosuccinate salt of the general formula $MA_n$, wherein M is a metal, n is the valence of M, and A is an ion of the general formula $[R_a-O-C(O)CH_2CH(SO_3^-)C(O)-O-R_b]$, in which each of $R_a$ and $R_b$ is an alkyl group, or other charge directors as found in WO 2007130069, which is incorporated herein by reference in its entirety. As described in WO 2007130069, the sulfosuccinate salt of the general formula $MA_n$ is an example of a micelle forming salt. The charge director may be substantially free of or free of an acid of the general formula HA, in which A is as described above. The charge director may comprise micelles of said sulfosuccinate salt enclosing at least some of the nanoparticles. The charge director may comprise at least some nanoparticles having a size of 200 nm or less, in some examples, 2 nm or more. As described in WO 2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{3+}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, $Br^-$, $BF_4^-$, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, LiTFA, $Al_2(SO_4)_3$, $LiClO_4$, and $LiBF_4$, or any sub-group thereof. The charge director may further comprise basic barium petronate (BBP).

In the formula $[R_a—O—C(O)CH_2CH(SO_3^-)C(O)—O—R_b]$, in some examples, each of $R_a$ and $R_b$ is an aliphatic alkyl group. In some examples, each of $R_a$ and $R_b$ independently is a $C_{6-25}$ alkyl group. In some examples, said aliphatic alkyl group is linear. In some examples, said aliphatic alkyl group is branched. In some examples, said aliphatic alkyl group includes a linear chain of 6 carbon atoms or more. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a—O—C(O)CH_2CH(SO_3^-)C(O)—O—R_b]$ and/or formula $MA_n$ may be as defined in any part of WO 2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 carbon atom hydrocarbon alkyl chain, and can be obtained, for example, from Chemtura. An example isopropyl amine sulphonate salt is dodecyl benzene sulfonic acid isopropyl amine, which is available from Croda.

In an electrostatic printing ink, the charge director can constitute about 0.001% to 20% by weight, in some examples, 0.01 to 20% by weight, in some examples, 0.01 to 10% by weight, in some examples, 0.01 to 1% by weight of the solids of an electrostatic printing ink and/or an electrostatically printed ink. The charge director can constitute about 0.001 to 0.15% by weight of the solids of a liquid electrostatic printing ink and/or electrostatically printed ink, in some examples, 0.001 to 0.15% by weight, in some examples, 0.001 to 0.02% by weight of the solids of a liquid electrostatic printing ink and/or electrostatically printed ink. In some examples, a charge director imparts a negative charge on an electrostatic printing ink. The particle conductivity may range from 50 to 500 pmho/cm, in some examples, from 200-350 pmho/cm.

Charge adjuvant: A liquid electrostatic printing ink and/or electrostatically printed ink may include a charge adjuvant. A charge adjuvant may be present with a charge director, and may be different to the charge director, and act to increase and/or stabilise the charge on particles, for example, resin-containing particles of an electrostatic printing ink. The charge adjuvant may include barium petronate, calcium petronate, Co salts of naphthenic acid, Ca salts of naphthenic acid, Cu salts of naphthenic acid, Mn salts of naphthenic acid, Ni slats of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In some examples, the charge adjuvant is aluminium di- and/or tristearate and/or aluminium di- and/or tripalmitate.

The charge adjuvant may constitute about 0.1 to 5% by weight of the solids of a liquid electrostatic printing ink and/or electrostatically printed ink. The charge adjuvant may constitute about 0.5 to 4% by weight of the solids of a liquid electrostatic printing ink and/or electrostatically printed ink. The charge adjuvant may constitute about 1 to 3% by weight of the solids of a liquid electrostatic printing ink and/or electrostatically printed ink.

Other additives: In some examples, an electrostatic printing ink and/or electrostatically printed ink may include an additive or a plurality of additives. The additive or plurality of additives may be added at any stage of the production of the electrostatic printing ink. The additive or plurality of additives may be selected form a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically the wax phase separates form the resin phase upon cooling of the resin fused mixture, after the transfer of the ink film to the label substrate, for example, from an intermediate transfer member, which may be a heated blanket.

Method

Described herein is a method of providing a printed label comprising: providing a label substrate having disposed thereon an electrostatically printed ink; applying a radiation curable overcoat composition to the printed ink, wherein the radiation curable overcoat composition comprises: radiation curable monomers and/or oligomers; a photoinitiator; and an organosilane having at least one hydrolysable group.

Figure 1:
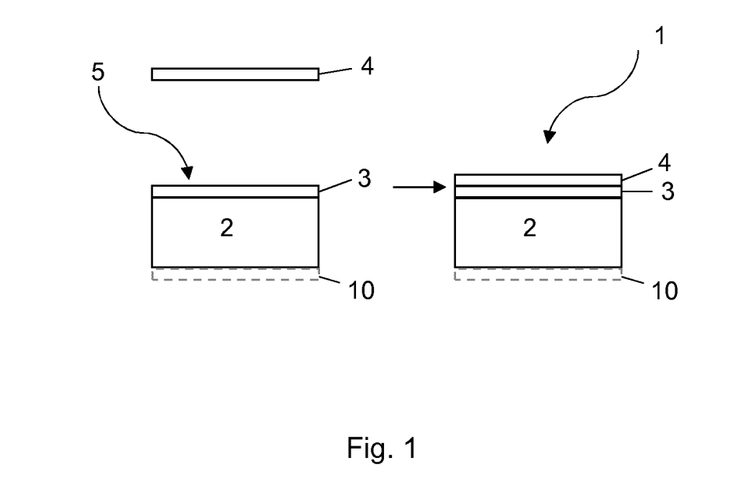
FIG. 1 shows schematically an example of a method for providing a printed label.
Figure 2:
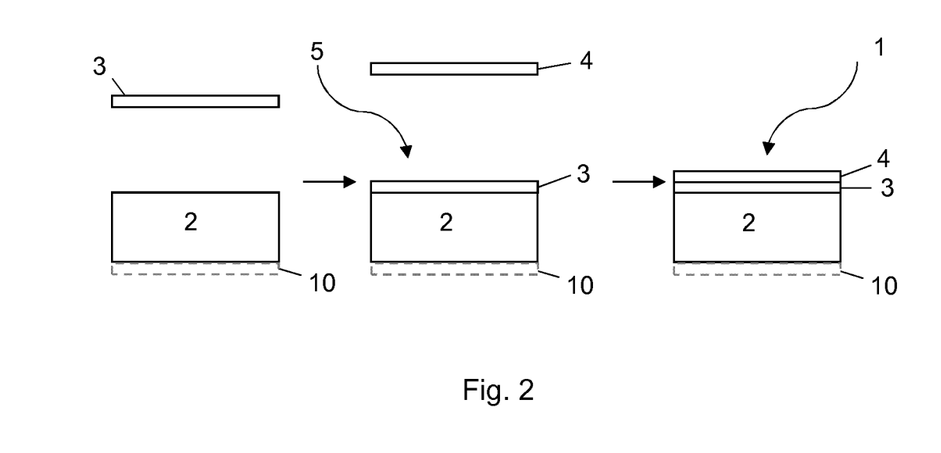
FIG. 2 shows schematically another example of a method of providing a printed label.

Examples of the method described herein are depicted schematically in FIGS. 1 and 2, in which the following reference numerals are used to identify the features indicated: reference numeral "1" denotes a printed label; reference numeral "2" denotes a label substrate; reference numeral "3" denotes an electrostatically printed ink or an electrostatic printing ink; reference numeral "5" denotes a printed label substrate; reference numeral "4" denotes a radiation curable overcoat composition or a radiation cured overcoat composition; reference numeral "6" denotes a primer; and reference numeral "10" denotes an adhesive that may be applied (at any stage of the method) to the opposing surface of the label substrate to the surface onto which the electrostatic printing ink is or will be applied or may have been applied to the label substrate prior to commencement of the method.

FIG. 1 depicts a method in which a printed label substrate (5) having an electrostatically printed ink (3) disposed thereon is provided. A radiation curable overcoat composition (4) is applied to the printed ink (3), wherein the radiation curable overcoat composition comprises radiation curable monomers and/or oligomers; a photoinitiator; and an organosilane having at least one hydrolysable group. In some examples, the radiation curable overcoat composition is then cured by using radiation. In some examples, the curing of the radiation curable overcoat composition causes polymerisation of the radiation curable monomers and/or oligomers. In some examples, the curing of the radiation curable overcoat composition causes the polymerisation of the radiation curable monomers and/or oligomers and a cross-linking reaction with any unreacted functional groups within the electrostatically printed ink.

In some examples, the radiation curable overcoat composition may be applied by any suitable technique. In some examples, the radiation curable overcoat composition is applied by gravure coating, flexo coating, screen coating or electrostatic printing. In some examples, the radiation curable overcoat composition may be applied by using a process in-line with the electrostatic printing of the electrostatic printing ink.

In some examples, the method comprises applying a corona treatment to the surface of the printed label substrate (5) before applying the radiation curable overcoat composition.

In some examples, the curing of the radiation curable overcoat composition is initiated and/or promoted by light (photoinitiation), such as visible light or ultraviolet light; heat (thermal initiation); electron beam (e-beam initiation); ionising radiation, such as gamma radiation (gamma initiation); non-ionising radiation, such as microwave radiation (microwave initiation); or any combination thereof. In some examples, the curing of the radiation curable overcoat composition is initiated by light. In some examples, the curing of the radiation curable overcoat composition is initiated by ultraviolet light. In some examples, radiation is emitted by a radiation source, for example, an ultraviolet light source. In some examples, the ultraviolet light source may be a UV lamp or a UV bulb.

In some examples, the ultraviolet light has an output power of 5000 W or less, in some examples, 4000 W or less, in some examples, 3000 W or less, in some examples 2500 W or less, in some examples, 2000 W or less, in some examples 1500 W or less. In some examples, the ultraviolet light has an output power of 500 W or more, optionally 600 W or more, optionally 700 W or more, optionally 800 W or more, optionally 900 W or more, optionally 1000 W or more. In some examples, the ultraviolet light has an output power of 500 to 5000 W, in some examples, 600 to 4000 W, in some examples, 700 to 3000 W, in some examples, 800 to 2500 W, in some examples, 900 to 2000 W, in some examples, 1000 to 1500 W. In some examples, the UV output power may refer to the power received by the UV source, for example, a UV lamp or a UV bulb and/or the power consumed by the UV source in emitting the UV irradiation and may also be referred to as the input intensity.

In some examples, the ultraviolet light has an output intensity at the surface of the substrate, that is an effective energy at the surface (sometimes referred to as the dosage) of 70 mJ/cm$^2$ or less, in some examples, 60 mJ/cm$^2$ or less, in some examples, 50 mJ/cm$^2$ or less, in some examples, 40 mJ/cm$^2$ or less, in some examples, 30 mJ/cm$^2$ or less, in some examples, 20 mJ/cm$^2$ or, in some examples, 15 mJ/cm$^2$. In some examples, the curing of the overcoat composition under UV irradiation is performed with a UV output intensity at the surface of the substrate of 1 mJ/cm$^2$ or more, in some examples, 2 mJ/cm$^2$ or more, in some examples, 3 mJ/cm$^2$ or more, in some examples, 4 mJ/cm$^2$ or more or, in some examples, 5 mJ/cm$^2$ or more. In some examples, the curing of the overcoat composition under UV irradiation is performed with a UV output intensity of 1 mJ/cm$^2$ to 70 mJ/cm$^2$, in some examples, 2 mJ/cm$^2$ to 60 mJ/cm$^2$, in some examples, 3 mJ/cm$^2$ to 50 mJ/cm$^2$, in some examples, 4 mJ/cm$^2$ to 40 mJ/cm$^2$, in some examples, 5 mJ/cm$^2$ to 30 mJ/cm$^2$, in some examples, 5 mJ/cm$^2$ to 20 mJ/cm$^2$ or, in some examples, 5 mJ/cm$^2$ to 15 mJ/cm$^2$.

In some examples, the method comprises applying a corona treatment to the printed label substrate before applying the radiation curable overcoat composition.

FIG. 2 depicts a method in which a label substrate (2) is provided. An electrostatic printing ink (3) is electrostatically printed onto the label substrate (2) to form a printed label substrate (5) having an electrostatically printed ink (3) disposed thereon. A radiation curable overcoat composition (4) is then applied to the printed ink (3), wherein the radiation curable overcoat composition comprises radiation curable monomers and/or oligomers; a photoinitiator; and an organosilane having at least one hydrolysable group. In some examples, the radiation curable overcoat composition is then cured by using radiation. In some examples, the curing of the radiation curable overcoat composition causes polymerisation of the radiation curable monomers and/or oligomers.

In some examples, electrostatically printing an electrostatic printing ink onto the label substrate may comprise printing any electrostatic printing ink described herein by any suitable electrostatic printing process. In some examples, electrostatically printing an electrostatic printing ink onto the label substrate may comprise liquid electrostatically printing a liquid electrostatic printing ink onto the label substrate. In some examples, electrostatically printing an electrostatic printing ink onto the label substrate may comprise liquid electrostatically printing a liquid electrostatic printing ink onto the label substrate by using a liquid electrostatic printing apparatus. Examples of suitable liquid electrostatic printing apparatus are the HP Indigo digital presses.

Figure 3:
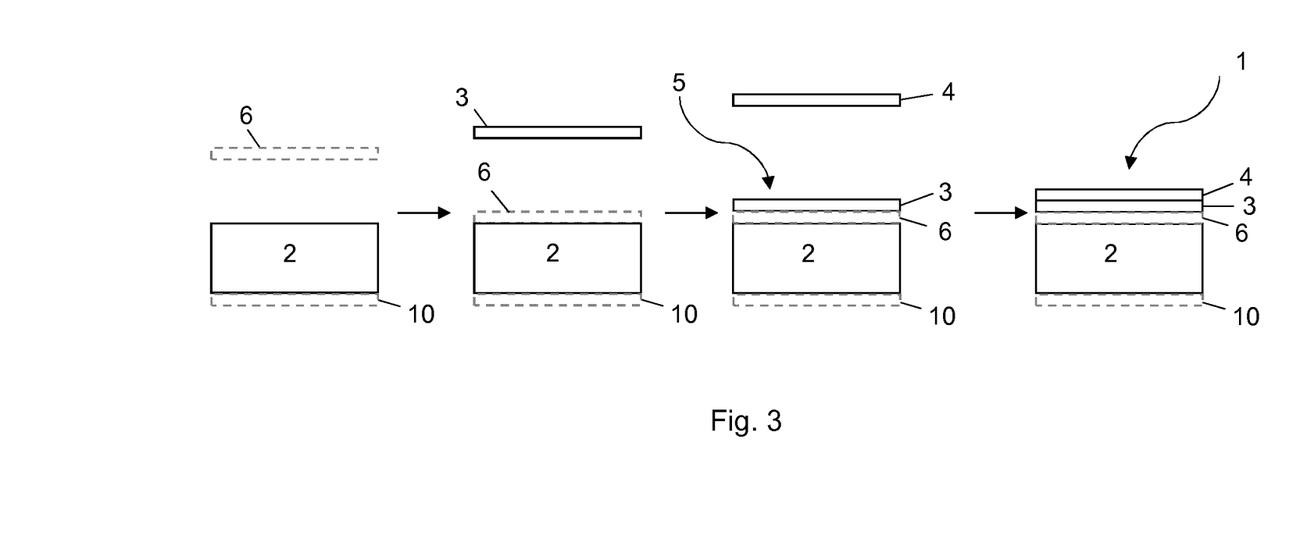
FIG. 3 shows schematically a further example of a method of providing a printed label.

FIG. 3 depicts a method in which a label substrate (2) is provided. A primer (6) is applied to the label substrate (2). An electrostatic printing ink (3) is then electrostatically printed onto the label substrate (2) to form a printed label substrate (5) having an electrostatically printed ink (3) disposed thereon. A radiation curable overcoat composition (4) is then applied to the printed ink (3), wherein the radiation curable overcoat composition comprises radiation curable monomers and/or oligomers; a photoinitiator; and an organosilane having at least one hydrolysable group. In some examples, the radiation curable overcoat composition is then cured by using radiation. In some examples, the curing of the radiation curable overcoat composition causes polymerisation of the radiation curable monomers and/or oligomers.

In some examples, the primer may be applied by any suitable technique. In some examples, the primer is applied by gravure coating, flexo coating, screen coating or electrostatic printing. In some examples, the primer may be applied by using a process in-line with the electrostatic printing of the electrostatic printing ink.

Also provided herein is an item having a printed label adhered thereto. The item may be a receptacle, for example a bottle. The item may comprise any material to which the label can adhere, e.g. a material selected from plastic, glass, a ceramic material, a cellulosic based material, e.g. paper or card.

EXAMPLES

The following illustrates examples of the materials, methods and related aspects described herein. Thus, these examples should not be considered to restrict the present disclosure, but are merely in place to teach how to make examples of compositions of the present disclosure. As such, a representative number of compositions and their method of manufacture are disclosed herein.

Example 1

A label substrate comprising a primer disposed on a surface of the label substrate and a liquid electrostatically printed ink was prepared by providing a label substrate comprising polyethylene (Clear P25, thickness: 80 µm; from Nirotek) which was primed with DiGiPrime 030 (DP030; from Michelman) and then liquid electrostatically printed with ElectroInk 4.5 (from HP Indigo) by using an HP Indigo WE6600 electrostatic printing press.

A UV curable overcoat composition comprising SENO-LITH® UV Flexo Gloss Lacquer (Weiburger; a mixture of 2,2-bis(acryloyloxymethyl)butyl acrylate (20-50 wt. %); an oligomer of 4,4'-(1-methylethylidene)bisphenol, (chloromethyl)oxirane and acrylate (12.5-20 wt. %); dipropylene glycol diacrylate (10-12.5 wt. %); (1-methyl-1,2-ethanediyl)bis[oxy(methyl-2,1-ethanediyl)]; benzophenone; and mequinol) and 10 wt. % of γ-glycidoxypropyltrialkoxysilane (GPS; from abcr GmbH) was applied to the printed ink and cured by using an ABG coating system containing an anilox roller having 200 lines/inch (78.74 lines/cm) using a coating speed of 25 m/min, a UV lamp (from GEW) output power of 2980 W and a corona density of 800 W. The resulting printed label was tested for water, chemical and mechanical resistance as described below.

Example 2—Comparative Example

A printed label was prepared as described in Example 1 except that no GPS was added to the UV curable overcoat composition.

Example 3

A printed label was prepared as described in Example 1 except that a label substrate comprising polyvinyl propylene (PP Clear IL 60, thickness: 60 µm; from UPM Raflatac) was used instead of the polyethylene label substrate.

Example 4—Comparative Example

A printed label was prepared as described in Example 3 except that no GPS was added to the UV curable overcoat composition.

Example 5

A printed label was prepared as described in Example 1 except that OPV EXC90092 UV varnish (from Toyo; a mixture of acrylated oligomers (20-50 wt. %); hexamethylene diacrylate (10-30 wt. %); (1-methyl-1,2-ethanediyl)bis[oxy(methyl-2,1-ethanediyl)] diacrylate; and acrylated polysiloxanes (<10 wt. %)) was used instead of SENOLITH® UV Lacquer.

Example 6—Comparative Example

A printed label was prepared as described in Example 5 except that no GPS was added to the UV curable overcoat composition.

Example 7

A printed label was prepared as described in Example 3 except that the varnish described in Example 5 was used.

Example 8—Comparative Example

A printed label was prepared as described in Example 7 except that no GPS was added to the UV curable overcoat composition.

Example 9

A printed label was prepared as described in Example 3 except that 5 wt. % aminopropyl trialkoxysilane (APS from Sigma-Aldrich) was used instead of GPS.

Example 10—Comparative Example

A printed label was prepared as described in Example 9 except that no APS was added to the UV curable overcoat composition.

Example 11

A printed label was prepared as described in Example 3 except that DiGiPrime 050 (DP050; from Michelman) was used instead of DiGiPrime 030 and the UV curable overcoat composition described in Example 9 was used instead of that described in Example 3.

Example 12—Comparative Example

A printed label was prepared as described in Example 11 except that no APS was added to the UV curable overcoat composition.

Example 13

A printed label was prepared as described in Example 1 except that a different primer (the primer containing up to 10 wt. % of a homopolymer of aziridine, CAS No. 9002-98-6) was used instead of DP030.

Example 14—Comparative Example

A printed label was prepared as described in Example 13 except that no GPS was added to the UV curable overcoat composition.

Water Resistance

Labels prepared according to Examples 1 to 12 were immersed in water at room temperature for 1, 3 and 20 hour periods. The ink coverage on the printed labels did not have a significant effect on the results of the tests and thus the results provided are an average over all areas of the labels. The samples were removed from the water after the indicated time period and wiped before a peeling test was conducted. The peeling test was conducted by applying an adhesive tape (3M Scotch tape 810) to the overcoat layer of each of the substrates. The adhesive tape was then peeled off and the peeling resistance was determined. The peeling resistance was determined by visually inspecting the printed label after the adhesive tape had been removed from the sample, with 0% indicating that no ink was left on the printed label after the peeling test and 100% indicating that no ink was removed by the removal of the adhesive tape. The samples were also tested for peeling resistance before immersion in water; all samples resulted in a value of 100% before immersion in water. The results are provided in Table 1 below. It is clear from the results that the addition of an organosilane significantly improves the water resistance.

TABLE 1

Water resistance test results

| Example | Substrate | Primer | OPV | Organo-silane | 1 h [%] | 3 h [%] | 20 h [%] |
|---|---|---|---|---|---|---|---|
| 1 | PE | DP030 | W | GPS | 100 | 100 | 97-100 |
| 2 (Comp.) | PE | DP030 | W | — | 0 | 0 | 0 |
| 3 | PP | DP030 | W | GPS | 100 | 90-97 | 80 |
| 4 (Comp.) | PP | DP030 | W | — | 0 | 0 | 0 |
| 5 | PE | DP030 | T | GPS | 100 | 100 | 95-100 |
| 6 (Comp.) | PE | DP030 | T | — | 0 | 0 | 0 |
| 7 | PP | DP030 | T | GPS | 100 | 100 | 97-100 |
| 8 (Comp.) | PP | DP030 | T | — | 0 | 0 | 0 |
| 9 | PP | DP030 | W | APS | 100 | 100 | 20 |
| 10 (Comp.) | PP | DP030 | W | — | 0 | 0 | 0 |
| 11 | PE | DP050 | W | APS | 97-100 | 98-100 | 95-100 |
| 12 (Comp.) | PE | DP050 | W | — | 20-50* | NA | 20-50* |

Key:
*20% for non-white containing areas and 50% for white-containing areas.
PE: polyethylene;
PP: polyvinyl propylene;
W: Senolith UV Flexo Gloss Lacquer from Weilburger;
T: EXC97010 UV varnish from Toyo;
GPS: γ-glycidoxypropyltrialkoxysilane;
APS: γ-aminopropyltrialkoxysilane.

Hot Water Resistance

Labels prepared according to examples 1 and 2 were immersed in water at 50, 60, 70, 80 and 90° C. for 10 min. After immersion, the labels were wiped and the peeling test described above was conducted. Labels not containing white pigmented ink compositions were tested. The samples were tested for water resistance before immersion in water; all samples resulted in a value of 100% before immersion in water.

TABLE 2

Hot water resistance test results

| Example | Substrate | Primer | OPV | Organo-silane | 50° C. [%] | 60° C. [%] | 70° C. [%] | 80° C. [%] | 90° C. [%] |
|---|---|---|---|---|---|---|---|---|---|
| 1 | PE | DP030 | W | GPS | 100 | 100 | 100 | 100 | 20 |
| 2 (Comp.) | PE | DP030 | W | — | 0 | 0 | 0 | 0 | 0 |

Key:
PE: polyethylene;
W: Senolith UV Flexo Gloss Lacquer from Weilburger;
GPS: γ-glycidoxypropyltrialkoxysilane.

Chemical Resistance

Labels prepared according to Examples 13 and 14 were immersed in various chemicals (see Table 3) for different 30 mins or 2 hours. After immersion, the labels were wiped and the peeling test described above was conducted. The peeling resistance was determined by visually inspecting the printed label after the adhesive tape had been removed from the sample, with 0%* indicating that no ink and 0** indicating that no OPV was left on the printed label after the peeling test or that the UV curable overcoat composition failed and 100% indicating that the ink and UV curable overcoat composition remained after removal of the adhesive tape. The ink coverage of each of the labels is included in Table 3 with high coverage indicating an ink coverage of 300-360% and low coverage indicating an ink coverage of 100-200%.

TABLE 3

Chemical resistance test results

| Example | Organo-silane | Ink coverage | Buffer pH 4 [%] | Buffer pH 10 [%] | Ethanol 70% [%] | Kanola oil [%] | Acetone [%] |
|---|---|---|---|---|---|---|---|
| Peeling test after 30 min immersion | | | | | | | |
| 13 | — | Low | 0* | 0* | 0** | 0** | 0** |
| 13 | — | High | 0* | 0* | 0** | 0** | 0** |
| 14 | GPS | Low | 100 | 100 | 100 | 100 | 100 |
| 14 | GPS | High | 100 | 100 | 100 | 100 | 100 |

TABLE 3-continued

| | | | Chemical resistance test results | | | | |
|---|---|---|---|---|---|---|---|
| Example | Organo-silane | Ink coverage | Buffer pH 4 [%] | Buffer pH 10 [%] | Ethanol 70% [%] | Kanola oil [%] | Acetone [%] |
| | | Peeling test after 2 hours immersion | | | | | |
| 13 | — | Low | 0* | 0* | 0** | 0** | 0** |
| 13 | — | High | 0* | 0* | 0** | 0** | 0** |
| 14 | GPS | Low | 100 | 100 | 100 | 100 | 100 |
| 14 | GPS | High | 100 | 100 | 100 | 100 | 100 |

Key:
*all of the ink was removed from the substrate;
**the UV curable overcoat composition failed;
GPS: γ-glycidoxypropyltrialkoxysilane.
Examples 13 and 14 used polyethylene as the label substrate, a primer comprising a homopolymer of aziridine and the UV curable overcoat composition comprising Senolith UV Flexo Gloss Lacquer from Weilburger, either with or without 10 wt. % GPS added to the UV curable overcoat composition.

While the methods, printed labels and related aspects have been described with reference to certain examples, those skilled in the art will appreciate that various modifications, changes, omissions, and substitutions can be made without departing from the spirit of the disclosure. It is intended, therefore, that the methods, printed labels and related aspects be limited by the scope of the following claims. Unless otherwise stated, the features of any dependent claim can be combined with the features of any of the other dependent claims, and any other independent claim.

The invention claimed is:

1. A method of providing a printed label, the method comprising:
   providing a printed label substrate having disposed thereon an electrostatically printed ink;
   applying a radiation curable overcoat composition to the printed ink, wherein the radiation curable overcoat composition comprises:
   radiation curable monomers and/or oligomers;
   a photoinitiator; and
   an organosilane having at least one hydrolysable group.

2. The method according to claim 1, wherein the organosilane has the following structure:

$(XR^1{-})_n Si(R^2)_{4-n}$ in which
   $XR^1{-}$ is a non-hydrolysable organic moiety, wherein X is a terminal group and $R^1$ is a linker group;
   $R^2$ is a hydrolysable organic moiety; and
   n is 0, 1, 2 or 3.

3. The method according to claim 2, wherein $XR^1$ is a substituted or unsubstituted hydrocarbon.

4. The method according to claim 2, wherein each $R^2$ is selected from the group consisting of halogens, $OR^3$, $NR^3R^4$, phosphates, sulfates, oxides or $OSiR^3{}_3$, in which $R^3$ and $R^4$ may be independently selected from hydrogen, substituted or unsubstituted alkyl, substituted or unsubstituted carboxyl, substituted or unsubstituted alkenyl, substituted or unsubstituted alkynyl and substituted or unsubstituted aryl and wherein each $R^2$ is the same or different.

5. The method according to claim 4, wherein each $R^2$ is selected from hydroxyl, methoxy, ethoxy, isopropoxy, propoxy, tert-butoxy, isobutoxy, butoxy, methoxyethoxy, methoxy-2-propoxy, methoxyethoxyethoxy, acetoxy, isopropenoxy and methylethylketoximino.

6. The method according to claim 3, wherein each $R^1$ is independently selected from $(CH_2)_m$ (wherein m is 0, 1, 2, 3 or more), alkenylene, alkynylene, aryl, alkylarylene and arylalkylene, wherein when m is 0, the linker group is a single bond.

7. The method according to claim 3, wherein each X is independently selected from hydrogen, halogen, vinyl, alkyl, alkenyl, acrylate, methacrylate, amino, alkylamino, aminoalkylamino, arylamino, benzylamino, alkylamido, alkylcarboxy, arylamido, arylcarboxy, alkylcarbamate, hydroxyl, thio, alkylthio, epoxy, glycidoxy and isocyanato.

8. The method according to claim 2, wherein n is 1.

9. The method according to claim 2, wherein $R^1$ is $(CH_2)_m$ and m is 0, 1, 2 or 3.

10. The method according to claim 1, wherein the printed label substrate comprises a synthetic polymer material having disposed thereon a primer wherein the primer is disposed between the synthetic polymer material and the electrostatically printed ink.

11. The method according to claim 1, wherein the organosilane is selected from glycidoxy propyl trialkoxysilane, aminopropyl trialkoxysilane, vinyltrialkoxysilane, methacroyl propyl trialkoxysilane, vinyl propyl trialkoxysilane, aminoethyl aminopropyl trialkoxysilane, benzyl amino trialkoxysilane, chloropropyl trialkoxysilane and mercapto propyl trialkoxysilane.

12. The method according to claim 1, wherein the radiation curable overcoat composition comprises 25 wt % or less organosilane.

13. The method according to claim 1, wherein the radiation curable monomers and/or oligomers are selected from a molecule comprising a plurality of epoxide groups, and a molecule comprising a plurality of alkene groups.

14. A printed label comprising:
   a label substrate;
   an electrostatically printed ink disposed on the label substrate; and
   an overcoat composition disposed on the printed ink that has been cured under irradiation,
   wherein the overcoat composition comprises the radiation cured product of a radiation curable overcoat composition comprising:
   radiation curable monomers and/or oligomers;
   a photoinitiator; and
   an organosilane having at least one hydrolysable group.

15. An ink and overcoat set comprising
   a liquid electrostatic printing ink composition; and
   a radiation curable overcoat composition comprising:
   radiation curable monomers and/or oligomers;
   a photoinitiator; and
   an organosilane having at least one hydrolysable group.

* * * * *